United States Patent [19]
Lee, Jr. et al.

[11] 3,929,493
[45] Dec. 30, 1975

[54] DENTAL BASE MATERIAL

[75] Inventors: Henry L. Lee, Jr., Pasadena; Jan A. Orlowski, Altadena, both of Calif.

[73] Assignee: Lee Pharmaceuticals, South El Monte, Calif.

[22] Filed: Apr. 9, 1974

[21] Appl. No.: 459,319

[52] U.S. Cl. ............... 106/35; 106/287 S; 424/357
[51] Int. Cl.² ........................................... C09K 3/00
[58] Field of Search ............ 106/35, 287 S, 120, 90, 106/35; 260/998.11; 424/357

[56] References Cited
UNITED STATES PATENTS

| | | | |
|---|---|---|---|
| 3,429,725 | 2/1969 | Keenum | 106/89 |
| 3,433,657 | 3/1969 | Pickering | 106/90 |
| 3,510,322 | 5/1970 | Higashi | 106/35 |
| 3,689,295 | 9/1972 | Hersey | 106/90 |

OTHER PUBLICATIONS

Chem. Abst. 1965 63:9652f.
Dental Silicate Cements, Alan D. Wilsen J. Dent. Res. Nov.–Dec. 1968 pp. 1133–1136.
Chem. Abst. 69:99,091q.

Primary Examiner—Theodore Morris
Attorney, Agent, or Firm—Irons & Sears

[57] ABSTRACT

Tooth cavities are lined with an aqueous paste of calcium silicate and an organic acid which reacts in situ to form a dental base material comprised of the calcium salt of the acid suspended in a network of silica gel.

12 Claims, No Drawings

DENTAL BASE MATERIAL

BACKGROUND OF THE INVENTION

1. Field of the Invention

This invention relates to improved compositions of matter for lining tooth cavities, subsequent to the removal of decayed enamel and dentin, in order to protect the pulp, promote secondary dentin formation, and provide a base for the dental restoration. More particularly, the present invention contemplates a composition of matter comprised of calcium silicate and an organic acid, preferably tartaric acid, which is used in the formation of a dental base material by forming an aqueous paste of said composition and coating the floor of the cavity with the paste thus formed so that the calcium silicate and the organic acid will react in situ to form a dental base material comprised of the calcium salt of the organic acid suspended in a network of silica gel. The term "tartaric acid", as used herein, is intended to include the various forms thereof, such as meso tartaric acid, d-tartaric acid, l-tartaric acid, and d,l-tartaric acid. Similarly, the term "calcium silicate" is intended to include the various forms thereof, including the calcium silicate minerals, e.g., wollastonite.

2. Description of Prior Art

In the restoration of teeth, it is the usual practice, particularly when decay has proceeded close to the pulp of the tooth, to line the floor of the cavity with a protective layer of material after the tooth has been readied for filling. The main purposes served by this lining are to protect the pulp from the environment and to help the pulp recover from the trauma of the restorative process. The dental base must protect the pulp from thermal, mechanical, and electric shock, marginal leakage around the filling, and toxic ingredients from the restoration itself. The dental base may also provide calcium ions, which evidently are used to recalcify damaged dentin and to form secondary dentin.

These requirements place certain physical restrictions on the materials that can be used as cavity bases. Generally they are non-metallic, they may contain calcium ions, they have a capacity to react with acid, and they have sufficient strength to withstand the packing force required to place an amalgam or a gold foil restoration. Most of the dental base materials on the market today fulfill these requirements to some degree, but they also have some very objectionable features.

The oldest dental base material is the mixture of zinc oxide and eugenol. This material has a compressive strength of about 2000 psi, and when reinforced with polymethyl methacrylate, the compressive strength rises to a maximum of 13,000 psi. Physically the zinc oxide-eugenol base is quite satisfactory, but it is incompatible with composite restorations since eugenol inhibits free radical polymerization. This restricts the dentist to the older types of restorations: amalgam or gold foil, and prevents him from using the more natural appearing composites.

Another type of dental base material consists primarily of calcium hydroxide. These materials typically have a compressive strength of about 2000 psi and when reinforced by the addition of various materials such as polymethyl methacrylate, the compression strength can go as high as 12,000 psi. While this mixture can donate calcium ions, it also has a high pH which may damage the odontoblasts, thus impeding healing.

SUMMARY OF THE INVENTION

The present invention embodies the advantages of the previous dental base materials without the drawbacks mentioned. Its unreinforced compressive strength is comparable to that of zinc oxide-eugenol and calcium hydroxide bases (over 2000 psi). It contains calcium ions to aid in the formation of secondary dentin. Since it does not contain eugenol, or other free radical scavengers, it is compatible with composite restorations. It is a neutral formulation, yet, when formulated to contain unreacted calcium silicate, it has the ability to react with excess ambient acid.

According to the present invention, it has been found that dental base materials possessing the desirable properties of the previously used base materials without their disadvantages can be formed from a composition of matter comprised of calcium silicate and an organic acid by mixing an aqueous paste of the composition, and applying it to the floor of a prepared cavity. Upon mixing the solution and the powder, the calcium silicate reacts with the organic acid to form a mixture of the calcium organic acid salt, e.g., calcium tartrate suspended in a network of silica gel. These components will normally be present in a molar ratio of about 1:4 to 1:1. For reasons noted hereinafter, the composition preferably also contains excess calcium silicate.

DESCRIPTION OF THE PREFERRED EMBODIMENT

In the practice of the preferred embodiment of the invention, the compositions of matter useful in forming dental base materials are available to the dentist in the form of an aqueous solution of the organic acid and a dry calcium silicate powder. For best results the calcium silicate used should be heated to 900° for 2 hours to drive off residual water and carbon dioxide. The powder is mixed with the solution forming a paste and initiating the reaction. These compositions are, in general, comprised of 30 to 50 percent aqueous solution of tartaric acid and powdered calcium silicate. The two components are mixed on a mol ratio of from about 4:1 to 1:1, calcium silicate to tartaric acid, or on a weight basis of the materials ready for use, from 1.5:1 to 1:1.4, powder to liquid. Desirably, a stoichiometric excess of calcium silicate is employed to neutralize any excess ambient acid. Preferably, the components are mixed in a mol ratio of 4:1 to about 2:1.

While the compositions used to form the dental base materials may consist wholly of calcium silicate and tartaric acid, minor amounts, i.e. up to 15 percent, eg, 10 percent, of the total composition, may be comprised of various additives which may be employed to modify the mechanical, chemical or biological properties of the composition, if desired. Exemplary of such optional additives are polymethyl methacrylate, polyacrylic acid, calcium fluoride, calcium phosphate, sodium monofluorophosphate, aminoacridine, allantoin, calcium hydroxide, calcium oxide, and zinc oxide.

The present composition may also be used as a temporary restorative material in substitution for conventional restorative materials.

EXAMPLES

The following examples are not intended to limit the scope of this invention to composition including tartaric acid; rather, all suitable organic acids forming low solubility calcium salts and forms of calcium silicate are intended to be included.

EXAMPLE 1

One gram of heat treated wollastonite (calcium metasilicate), particle size about 15–18 $\mu$ in diameter, is mixed with 1.2g of 50% aqueous solution of d-Tartaric acid. The paste sets up within 1 to 4 minutes.

| Properties of Cured Material | |
| --- | --- |
| Compressive Strength | |
| Initial (dry), 3–4 hrs. at room temperature | 2720 psi |
| After 24 hrs. in distilled water at 37°C | 2105 psi |
| After one week in distilled water at 37°C | 2000 psi |
| pH | 4 |
| Solubility in water (24 hrs. at 37°C) | 3.5% |

EXAMPLE 2

One gram of heat treated wollastonite, about 15–18 $\mu$ in diameter, is mixed with one gram of water solution consisting of 40% d-Tartaric acid and 5% WS-801 (a trademark of B. F. Goodrich for polyacrylic acid). The paste sets up within 5 minutes. The mixture is more viscous, before it sets, than that of EXAMPLE 1, and thus would be more easily applied to maxillary cavities.

| Properties of Cured Material | |
| --- | --- |
| Compressive Strength | |
| Initial (dry), 3–4 hrs. at room temperature | 5060 psi |
| After 24 hrs. in distilled water at 37°C | 895 psi |
| After one week in distilled water at 37°C | 635 psi |
| pH | 5 |
| Solubility in water (24 hrs. at 37°C) | 2.0% |

EXAMPLE 3

One gram of powder consisting of 96% heat treated wollastonite and 4% zinc oxide, is mixed with one gram of water solution consisting of 40% d-Tartaric acid, 5% WS-801, and 55% water. The paste sets up within 5 minutes. As in example 2, the paste is viscous enough to be easily applied even to a maxillary cavity.

| Properties of Cured Material | |
| --- | --- |
| Compressive Strength | |
| Initial (dry), 3–4 hrs. at room temperature | 3315 psi |
| After 24 hrs. in distilled water at 37°C | 1865 psi |
| After one week in distilled water at 37°C | 1510 psi |
| pH | 5 |
| Solubility in water (24 hrs. at 37°C) | 1.5% |

It will be apparent from the foregoing description that many modifications and variations may be made without departing from the spirit and scope of the present invention.

What is claimed is:

1. A dental base material comprised of an organic acid salt of calcium suspended in a network of silica gel.

2. The dental base material of claim 1, wherein said organic acid salt is calcium tartrate.

3. The dental base material of claim 1, wherein said organic acid salt of calcium and said silica gel are present in molar ratio of about 1:4 to 1:1.

4. The dental base material of claim 1 additionally containing unreacted calcium silicate.

5. A process for lining a tooth cavity comprising coating said cavity with a composition of matter comprised of a uniform admixture of calcium silicate and an organic acid.

6. The process of claim 5, wherein said organic acid is tartaric acid.

7. The process of claim 5, wherein said calcium silicate and said organic acid are present in a molar ratio of from about 4:1 to 1:1.

8. A process for preparing a dental base material comprising reacting calcium silicate with an organic acid to form an organic acid salt of calcium suspended in a network of silica gel.

9. The process of claim 8 wherein the organic acid is tartaric acid.

10. The process of claim 8 wherein said calcium silicate and said organic acid are present in a molar ratio of from about 4:1 to 1:1.

11. The process of claim 9 wherein said calcium silicate and said tartaric acid are present in a molar ratio of from about 4:1 to 1:1.

12. A process for preparing a dental base material comprising reacting a mixture of calcium silicate and an organic acid with up to about 15 percent of said mixture of an additive selected from the group consisting of polyacrylic acid, zinc oxide, calcium fluoride, calcium phosphate, sodium monofluorophosphate, aminoacridine, allantoin, calcium hydroxide, calcium oxide and mixtures thereof to form an organic acid salt of calcium suspended in a network of silica gel.

* * * * *